United States Patent Office 3,654,172
Patented Apr. 4, 1972

3,654,172
TERBIUM ACTIVATED RADIOLUMINESCENT
SILICATE GLASSES
Richard F. Reade, Corning, N.Y., assignor to Corning
Glass Works, Corning, N.Y.
No Drawing. Continuation-in-part of application Ser. No. 785,347, Dec. 19, 1968. This application Mar. 26, 1970, Ser. No. 23,041
Int. Cl. C03c; C09k 1/54
U.S. Cl. 252—301.4 F       5 Claims

ABSTRACT OF THE DISCLOSURE

This invention relates to glass compositions which emit strong, visible luminescence when exposed to such ionizing radiations as X-rays, gamma-rays, or cathode rays. In particular, this invention relates to glasses within the alkali metal-alkaline earth metal-silica composition field which are activated by terbium to emit strong, visible luminescence when exposed to X-radiations having energies ranging from 50–120 kilovolts (kv.), such as are commonly encountered in medical radiography practice.

This application is a continuation-in-part of my application Ser. No. 785,347, filed Dec. 19, 1968, and now abandoned.

The most common type of X-ray film employed in medical practice is designed to be exposed between luminescent intensifying screens which are generally composed of polycrystalline phosphors. Under the action of X-radiation these polycrystalline phosphor screens emit visible and ultraviolet rays to which the film is sensitive. A difference in the action of X-rays and that of visible and ultraviolet rays on the film emulsion can be readily observed in the varying degrees of blackening in the developed film. Thus, for a given set of exposure conditions, the luminescent light emitted by the screen produces a greater degrees of film blankening than can be attained through the action of X-rays alone. Therefore, through the use of these intensifying screens, the time to which a patient must be exposed to X-radiation can be reduced significantly.

Two other commercial applications for polycrystalline phosphor screens are the conversion of X-rays into visible light for direct viewing purposes such as in X-ray kuoroscopy and for electronic amplification such as in image intensifier tubes.

However, inasmuch as these screens are composed of a multiplicity of very fine-grained crystals of a phosphor deposited on a transparent plastic or glass support, or embedded in a transparent plastic matrix, they are intrinsically grainy and multilayered. This particulate nature of the screens causes the luminescent light to be internally reflected and scattered among the particles and voids therebetween. In addition to the resulting loss of useful light output, this reflection and scattering tends to diffuse the emitted luminescence, thereby causing some loss of detail and resolution in the screen display itself or in the final photographic image. The loss of resolution is especially objectionable in the more advanced medical radiographic systems which are designed to produce a three-dimensional or stereoscopic effect in the photographic image since high resolution is necessary to enhance the three-dimensional effect.

Transparent phosphor screens can provide images with better resolution and detail inasmuch as there are no internal light scattering centers present therein. In view of this, luminescent glasses would appear to be an ideal material for the fabrication of such screens. In addition to ease of manufacture and excellent optical properties, glass phosphor screens offer advantages in mechanical strength and integrity, chemical durability, and abrasion resistance. Nevertheless, although many glasses containing such luminescence activators as uranium, samarium, europium, lead, tin, and antimony are known to fluoresce strongly upon exposure to ultraviolet light, these glasses luminesce relatively weakly under X-ray excitation. Therefore, glass phosphor screens have not furnished a practical alternative to the polycrystalline screen.

The primary object of this invention is to provide transparent glass compositions which will luminesce strongly when subjected to X-radiation such as to be eminently suitable for use as transparent phosphor screens.

I have discovered that transparent glasses which emit strong, visible luminescence when exposed to X-rays, gamma-rays, and cathode-ray excitation and, particularly, when exposed to X-radiation having energies ranging from 50–120 kv. can be produced from compositions within the alkali metal-alkaline earth metal-silica field that are activated by terbium. Such glasses consist essentially, by weight on the oxide basis, of about 3–30% $R_2O$, wherein $R_2O$ consists of 0–5% $Li_2O$, 0–25% $Na_2O$, 0–30% $K_2O$, 0–25% $Rb_2O$, and 0–25% $Cs_2O$, 5–55% RO, wherein RO consists of 0–20% MgO, 0–30% CaO, 0–45% SrO, and 0–55% BaO, 35–75% $SiO_2$, and 0.75–10% $Tb_2O_3$.

To insure achieving very intense luminescence, I have determined that at least one alkali metal oxide selected from the group consisting of $Li_2O$ and/or $Na_2O$ and at least one alkaline earth metal oxide selected from the group consisting of SrO and BaO should be included in the glass composition. Therefore, in general, very satisfactory luminescence will be obtained in glass compositions consisting essentially, by weight on the oxide basis, of about 3–25% $R_2O$, 5–55% RO, 40–70% $SiO_2$, and 0.75–7% $Tb_2O_3$, wherein $R_2O$ consists of 0–5% $Li_2O$ and 0–25% $Na_2O$, and wherein RO consists of 0–45% SrO and 0–55% BaO.

Finally, the most intense luminescence will be attained where a combination of three alkali metal oxides constitutes a portion of the glass composition and, particularly, where these three alkali metal oxides are present in approximately equimolar proportions. For example, the equimolar ratio of $K_2O:Na_2O:Li_2O$ approximates $3K_2O:2Na_2O:Li_2O$ on a weight ratio basis. Although the highest intensities are secured with equimolar proportions, some deviation therefrom can be tolerated, especially at high levels of terbium concentration, with minimum effect. Thus, on this basis, my preferred glass compositions consist essentially, by weight on the oxide basis, of about 45–65% $SiO_2$, 20–45% RO, wherein RO consists of 0–35% SrO, and 0.45% BaO, 1–7.5% $Tb_2O_3$, and 5–20% $R_2O$, wherein $R_2O$ consists of three alkali metal oxides in the indicated proportions selected from the group consisting of 0–2.5% $Li_2O$, 0–5% $Na_2O$, 0–10% $K_2O$, 0–15% $Rb_2O$, and 0–15% $Cs_2O$. In general, I have observed that the inclusion of 0.75–2.5% $Li_2O$ and 1.75–5% $Na_2O$ in these glass compositions assure excellent luminescence.

Table I records examples of glasses having compositions falling within the above-prescribed ranges, expressed in weight percent on the oxide basis and containing either one or two alkali metal oxides. The batch constituents may comprise any materials, either the oxides or other compounds, which, when melted together, are transformed to the desired oxide composition in the proper portions. The batch components were blended together, ballmilled to aid in assuring a homogeneous melt, placed in either fused silica or platinum crucibles, and then melted at 1400°–1550° C. for about 6 hours. The melts were poured onto a steel plate to yield a circular patty about ⅜" thick. The patties were transferred immediately to an annealer operating at about 550° C.

Although the glasses recorded in Table I were made in accordance with the laboratory procedure outlined above, it will be appreciated that where large quantities of glass are desired these compositions are amenable to conventional glass melting techniques in pots or continuous tanks. Likewise, these glasses can be shaped by commercial glass-forming techniques such as blowing, casting, drawing, pressing, rolling, etc.

The utility of these glasses can be demonstrated by measuring the effectiveness of the X-ray induced luminescent light to darked a photographic film. Thus, a panchromatic photographic film is placed in pressure contact with the glass surface facing the X-ray beam of a conventional medical X-ray unit. The panchromatic film provides essentially equivalent spectral sensitivity to visible and ultraviolet light ranging between about 350–750 millimicrons. The beam of X-rays passes through the film and excites the glass sample to luminesce. In this manner, only back-reflected luminescent light strikes the film, thereby minimizing errors caused by the varying degrees of X-ray absorption in the individual samples.

The darkening of the film is measured by conventional densitometry procedures. Thus, a "relative film density" is obtained by comparing the darkening produced in the exposed film by direct X-radiation impingement with the additional darkening produced by the luminescent glasses utilizing the equation:

$$D = \log_{10} \frac{T_x}{T_L}$$

wherein $T_x$ is the percent transmission of a beam of visible light through an area of the film which has been exposed to direct X-radiation alone; $T_L$ is the transmission of a beam of visible light through an area of the film which has received the additional exposure of the luminescent light; and D is termed the relative film density. This procedure permits the additional darkening provided by the luminescent light to be compared directly from sample to sample. For purposes of comparison, as recorded in Table I, the relative film density produced by a preferred single alkali metal oxide glass composition, viz., Example 6, when exposed to 86 kv. X-rays was assigned an arbitrary value of 100. Each of the other samples was exposed to 86 kv. X-radiation and the darkening observed therein is expressed in Table I relative to Example 6 which was included as a control sample in each run.

TABLE I

| Percent | 1 | 2 | 3 | 4 | 5 | 6 | 7 | 8 |
|---|---|---|---|---|---|---|---|---|
| $SiO_2$ | 58.6 | 58.3 | 57.8 | 57.5 | 57.3 | 56.9 | 56.3 | 55.7 |
| BaO | 27.1 | 26.9 | 26.7 | 26.6 | 26.5 | 26.3 | 26.0 | 25.8 |
| $Na_2O$ | 12.4 | 12.3 | 12.2 | 12.1 | 12.1 | 12.0 | 11.9 | 11.8 |
| $Al_2O_3$ | 0.8 | 0.8 | 0.8 | 1.0 | 0.8 | 0 8 | 0.8 | 0.8 |
| $Tb_2O_3$ | 1.0 | 1.6 | 2.4 | 2.9 | 3.2 | 4.0 | 5.0 | 6.0 |
| Relative film density | 72 | 84 | 90 | 94 | 97 | 100 | 86 | 78 |

| Percent | 9 | 10 | 11 | 12 | 13 | 14 | 15 | 16 |
|---|---|---|---|---|---|---|---|---|
| $SiO_2$ | 54.2 | 57.7 | 41.5 | 48.2 | 57.6 | 63.4 | 48.4 | 47.4 |
| BaO | 25.1 | 12.1 | 52.8 | 41.0 | 26.7 | 13.5 | 41.2 | 40.3 |
| $Na_2O$ | | | 3.5 | 8.3 | 12.2 | 19.0 | 4.2 | |
| $Al_2O_3$ | 0.7 | 0.8 | | | 0.8 | 0.9 | | |
| $K_2O$ | 17.3 | 26.4 | | | | | 6.3 | 13.4 |
| $Tb_2O_3$ | 2.7 | 2.9 | 2.1 | 2.4 | 2.8 | 3.2 | 2.4 | 2.4 |
| Relative film density | 88 | 83 | 87 | 91 | 103 | 86 | 100 | 94 |

| Percent | 17 | 18 | 19 | 20 | 21 | 22 | 23 | 24 |
|---|---|---|---|---|---|---|---|---|
| $SiO_2$ | 50.0 | 51.1 | 53.7 | 40.4 | 49.7 | 55.2 | 58.4 | 62.1 |
| BaO | 42.5 | 43.5 | 37.3 | 34.4 | | | | |
| $Na_2O$ | 6.4 | 2.2 | | | 4.3 | 9.5 | 17.7 | 16.0 |
| $Al_2O_3$ | 1.4 | 1.4 | 0.6 | 0.5 | 0.7 | 0.8 | 0.9 | 0.9 |
| SrO | | | | | 42.8 | 31.7 | 19.8 | 17.8 |
| $Li_2O$ | 1.0 | 3.2 | | | | | | |
| $Rb_2O$ | | | 16.2 | | | | | |
| $Cs_2O$ | | | | 22.6 | | | | |
| $Tb_2O_3$ | 2.5 | 2.6 | 2.1 | 1.9 | 2.5 | 2.8 | 3.2 | 3.1 |
| Relative film density | 103 | 106 | 76 | 84 | 97 | 103 | 95 | 95 |

| Percent | 25 | 26 | 27 | 28 | 29 | 30 | 31 | 32 |
|---|---|---|---|---|---|---|---|---|
| $SiO_2$ | 66.3 | 50.2 | 55.9 | 63.0 | 56.8 | 60.1 | 62.4 | 60.6 |
| SrO | 9.5 | 43.3 | 32.1 | 18.1 | 32.9 | 8.5 | | |
| $Na_2O$ | 19.8 | 2.2 | 7.2 | 13.5 | 2.4 | | 5.4 | |
| $Li_2O$ | | 1.0 | 1.2 | 1.3 | 3.5 | | | |
| $Al_2O_3$ | 0.9 | 0.7 | 0.8 | 0.9 | 1.6 | 0.8 | | |
| CaO | | | | | | | 28.9 | 28.2 |
| $K_2O$ | | | | | | 27.5 | | 7.9 |
| $Tb_2O_3$ | 3.3 | 2.6 | 2.8 | 3.2 | 2.9 | 3.0 | 3.1 | 3.2 |
| Relative film density | 93 | 106 | 106 | 100 | 100 | 80 | 77 | 72 |

| Percent | 33 | 34 | 35 | 36 | 37 | 38 | 39 | 40 |
|---|---|---|---|---|---|---|---|---|
| $SiO_2$ | 69.3 | 64.4 | 64.3 | 67.4 | 71.6 | 66.5 | 65.4 | 49.4 |
| CaO | 11.7 | 10.9 | 5.4 | 21.0 | | | 20.4 | |
| $Na_2O$ | 14.6 | | 20.8 | 11.6 | 15.1 | | 5.6 | 8.5 |
| $K_2O$ | | 20.6 | | | | 21.2 | 8.6 | |
| MgO | | | | | 8.8 | 8.1 | | |
| $Al_2O_3$ | 1.0 | 0.9 | 1.0 | | 1.0 | 1.0 | | |
| BaO | | | | | | | | 42.1 |
| $Tb_2O_3$ | 3.4 | 3.2 | 3.5 | 3.4 | 3.5 | 3.3 | 3.3 | 2.5 |
| Relative film density | 76 | 74 | 75 | 90 | 70 | 74 | 87 | 94 |

| Percent | 41 | 42 |
|---|---|---|
| $SiO_2$ | 63.6 | 69.4 |
| $Na_2O$ | | 6.0 |
| $K_2O$ | 16.6 | 9.1 |
| CaO | 19.8 | |
| MgO | | 15.5 |
| $Tb_2O_3$ | 3.2 | 3.5 |
| Relative film density | 74 | 87 |

Table II compares the relative film density at various X-ray energy levels of several of the above glasses with commercially available polycrystalline phosphor intensifier screens known in the trade as "Par" speed and "High" speed screens. These have been termed "fast" screens since they are designed to produce the greatest amount of film darkning for a given time of exposure to X-radiation but sacrifice image resolution in so doing.

TABLE II

| Example No.: | X-ray energy, kv. | Relative film density |
|---|---|---|
| 6 | 66 | 74 |
| 6 | 76 | 88 |
| 6 | 86 | 100 |
| 6 | 96 | 110 |
| 6 | 106 | 118 |
| 17 | 66 | 72 |
| 17 | 76 | 87 |
| 17 | 86 | 100 |
| 17 | 96 | 103 |
| 17 | 106 | 115 |
| 26 | 66 | 78 |
| 26 | 76 | 92 |
| 26 | 86 | 103 |
| 26 | 96 | 109 |
| 26 | 106 | 118 |
| 15 | 66 | 76 |
| 15 | 76 | 90 |
| 15 | 86 | 100 |
| 15 | 96 | 112 |
| 15 | 106 | 118 |
| Commercial | 66 | 92–97 |
| Do | 76 | 103–106 |
| Do | 86 | 112–115 |
| Do | 96 | 115–118 |
| Do | 106 | 115–125 |

An examination of Table II demonstrates that at the X-ray energy levels commonly encountered in medical radiographic practice, viz, 50–120 kv., the polycrystalline phosphor screens of commerce exhibit a very slightly higher relative film density than the single or two-alkali luminescent glasses of the instant invention. This advantage, however, is more than outweighed by the greatly improved image resolution and detail possible with the glasses of this invention. Nevertheless, in order to manifest satisfactory operating properties, I have determined that the glass should exhibit a relative film density at 86 kv. of at least 70.

In addition, the properties of transparency and ready formability allow these glasses to be fabricated into shapes or geometries which enhance the useful luminescent light output. For example, X-radiation of Example No. 6 in the shape of a redrawn circular rod demonstrated an 18% increase in relative film density at 86 kv. A similar composition manifested a 37% increase in relative film density at 86 kv. when X-irradiated in the form of a fiber optic with aluminizing on the side opposite the photographic film.

That the proportions of alkali metal oxide, alkaline earth metal oxide, and terbium oxide are critical to the invention is illustrated in Table III where several glasses are listed which luminesce poorly under 86 kv. X-radiation. $SiO_2$ acts as a network former and must be present in sufficient quantity to produce a glass. Examples 43 and 44 clearly demonstrate terbium levels too low to provide the desired minimum film density.

TABLE III

| Percent | 43 | 44 | 45 | 46 | 47 |
|---|---|---|---|---|---|
| $SiO_2$ | 59.1 | 58.9 | 42.8 | 42.1 | 34.8 |
| BaO | 27.4 | 27.3 | 54.6 | 53.7 | 51.5 |
| $Na_2O$ | 12.5 | 12.5 | | | |
| $Al_2O_3$ | 0.8 | 0.8 | 0.6 | 0.6 | |
| CaO | | | | 1.6 | 13.6 |
| $K_2O$ | | | | | |
| $Tb_2O_3$ | 0.2 | 0.5 | 2.0 | 2.0 | 2.1 |
| Density | 52 | 60 | 32 | 40 | 33 |

| | 48 | 49 | 50 | 51 |
|---|---|---|---|---|
| $SiO_2$ | 34.6 | 59.6 | 58.6 | 10.0 |
| BaO | 51.3 | | | 70.0 |
| $Na_2O$ | | | 1.6 | |
| $Al_2O_3$ | | 18.3 | 18.0 | 1.0 |
| CaO | 13.6 | 11.0 | 10.9 | |
| MgO | | 7.8 | 7.7 | |
| $K_2O$ | 0.5 | 0 | | |
| $B_2O_3$ | | | | 20.0 |
| $Tb_2O_3$ | 2.1 | 3.2 | 3.2 | 0.5 |
| Density | 38 | 6 | 7 | 44 |

Table IV reports examples of glasses, in weight percent on the oxide basis, having compositions of the preferred embodiment of the invention, viz, compositions containing three alkali metal oxides in approximately an equimolar ratio. These glasses were produced in the manner to those set out in Table I and likewise exposed to 86 kv. X-rays. The darkening observed is expressed relative to Example 6 such as to provide a direct comparison with the single and two alkali metal oxide glasses.

TABLE IV

| Percent | 52 | 53 | 54 | 55 | 56 |
|---|---|---|---|---|---|
| $SiO_2$ | 50.7 | 50.6 | 50.6 | 50.5 | 50.4 |
| BaO | 38.2 | 37.4 | 36.3 | 35.9 | 34.1 |
| $K_2O$ | 4.4 | 4.4 | 4.4 | 4.4 | 4.4 |
| $Na_2O$ | 2.9 | 2.9 | 2.9 | 2.9 | 2.9 |
| $Li_2O$ | 1.4 | 1.4 | 1.4 | 1.4 | 1.4 |
| $Al_2O_3$ | 1.5 | 1.5 | 1.5 | 1.5 | 1.5 |
| $Tb_2O_3$ | 0.8 | 1.7 | 2.6 | 3.4 | 4.3 |
| RFD | 90 | 103 | 106 | 122 | 124 |

| | 57 | 58 | 59 | 60 | 61 |
|---|---|---|---|---|---|
| $SiO_2$ | 50.4 | 50.2 | 46.8 | 47.5 | 47.5 |
| BaO | 34.3 | 33.6 | 43.9 | 40.5 | 40.5 |
| $K_2O$ | 4.4 | 4.4 | 2.9 | 4.1 | 3.1 |
| $Na_2O$ | 2.9 | 2.9 | 1.9 | 2.7 | 2.1 |
| $Li_2O$ | 1.4 | 1.4 | 0.9 | 1.3 | 1.0 |
| $Al_2O_3$ | 1.5 | 1.5 | 1.3 | 1.4 | 3.4 |
| $Tb_2O_3$ | 5.1 | 6.0 | 2.3 | 2.5 | 2.3 |
| RFD | 131 | 131 | 98 | 112 | 104 |

| | 62 | 63 | 64 | 65 | 66 |
|---|---|---|---|---|---|
| $SiO_2$ | 47.2 | 56.5 | 46.9 | 46.7 | 51.6 |
| BaO | 40.2 | 24.1 | 40.0 | 39.7 | 22.0 |
| SrO | | | | | 13.3 |
| $K_2O$ | 4.1 | 7.4 | 4.1 | 4.1 | 4.5 |
| $Na_2O$ | 2.7 | 4.9 | 2.7 | 2.7 | 3.0 |
| $Li_2O$ | 1.3 | 2.3 | 1.3 | 1.3 | 1.4 |
| $Al_2O_3$ | 1.4 | 1.7 | 1.4 | 1.4 | 1.4 |
| $Tb_2O_3$ | 3.1 | 3.0 | 3.6 | 4.2 | 2.6 |
| RFD | 109 | 106 | 115 | 115 | 110 |

| | 67 | 68 | 69 | 70 | 71 |
|---|---|---|---|---|---|
| $SiO_2$ | 54.2 | 59.8 | 54.8 | 59.0 | 57.4 |
| BaO | 17.2 | | | | |
| SrO | 11.6 | 28.5 | 31.5 | 22.8 | 25.2 |
| $K_2O$ | 5.0 | 3.6 | 4.8 | 6.7 | 5.6 |
| $Na_2O$ | 3.3 | 2.4 | 3.1 | 4.4 | 3.7 |
| $Li_2O$ | 1.6 | 1.1 | 1.5 | 2.1 | 1.7 |
| $Al_2O_3$ | 1.6 | 1.6 | 1.6 | 1.8 | 1.8 |
| $Tb_2O_3$ | 5.6 | 2.8 | 2.8 | 3.1 | 4.6 |
| RFD | 130 | 104 | 104 | 114 | 114 |

| | 72 | 73 | 74 | 75 | 76 |
|---|---|---|---|---|---|
| $SiO_2$ | 54.0 | 57.4 | 57.0 | 57.9 | 57.9 |
| SrO | 26.0 | 24.5 | 24.3 | 24.7 | 24.7 |
| $K_2O$ | 6.1 | 5.2 | 7.5 | 3.0 | 5.3 |
| $Na_2O$ | 4.0 | 3.5 | 2.0 | 5.0 | 2.0 |
| $Li_2O$ | 1.9 | 1.6 | 1.6 | 1.7 | 2.4 |
| $Al_2O_3$ | 1.7 | 1.7 | 1.7 | 1.7 | 1.7 |
| $Tb_2O_3$ | 6.0 | 6.0 | 5.9 | 6.0 | 6.0 |
| RFD | 130 | 130 | 128 | 132 | 130 |

| | 77 | 78 | 79 | 80 | 81 |
|---|---|---|---|---|---|
| $SiO_2$ | 60.8 | 64.2 | 60.4 | 58.3 | 55.8 |
| SrO | 22.7 | 20.9 | 21.8 | 21.8 | 20.8 |
| $K_2O$ | 4.5 | 3.7 | 4.4 | | |
| $Na_2O$ | 3.0 | 2.5 | 3.0 | 2.9 | 2.8 |
| $Li_2O$ | 1.4 | 1.2 | 1.4 | 1.3 | 1.3 |
| $Rb_2O$ | | | | 8.4 | |
| $Cs_2O$ | | | | | 12.3 |
| $Al_2O_3$ | 1.7 | 1.7 | 1.7 | 1.6 | 1.5 |
| $Tb_2O_3$ | 5.9 | 5.9 | 7.3 | 5.7 | 5.4 |
| RFD | 132 | 124 | 124 | 133 | 123 |

This table clearly demonstrates that several of the examples equal or exceed the light output of the commercial polycrystalline phosphor screens. The data indicate that at higher terbium levels, atom for atom substitution of terbium for barium (Examples 55–58) promotes an additional luminescence enhancement over glasses wherein terbium is merely added to the overall base composition (Examples 62, 64, 65).

The comparison of these glasses of Table IV with Example 6 is also useful in illustrating the maximum $Tb_2O_3$ level that can be incorporated in a particular base glass before concentration quenching of the terbium begins to diminish luminescence output. Hence, in the single alkali glasses, as represented by Example 6, the maximum luminescence will be obtained with a $Tb_2O_3$ concentration of about 4% by weight. The mixed alkali metal oxide glasses permit incorporation of higher terbium values before concentration quenching begins. This fact comprises the principal basis for the very high relative film density measurements determined at 5–7% by weight $Tb_2O_3$.

Inasmuch as the maximum terbium luminescence takes place at a wave length of about 5500 A., in the green portion of the spectrum, the use of a green sensitive photographic film will enhance the degree of film blackening over that observed with panchromatic film. These glasses of Table IV also luminesce very well under cathode ray excitation. Thus, the cathodoluminescence of Example 57 is easily visible in room light and is superior to that exhibited by Example 6.

The presence of alkali metal oxide in the glass composition is necessary to obtain good luminescent light output under X-ray excitation. An excess of the alkali metal oxides, however, acts to undesirably decrease the chemical durability of the glass. Too low an alkaline earth oxide level also tends to decrease the chemical durability of the glass; whereas an excess thereof leads to instability of the glass to devitrification, particularly in those forming operations requiring the glass to be maintained at high temperatures during working. The utilization of the heavier alkaline earth metal oxides is advantageous in increasing the absorption of X-rays by the glass and thereby improving the luminescent light output. The minimum of about 0.75% by weight of $Tb_2O_3$ provides what has arbitrarily been considered the lowest practical luminescent light output for X-ray excitations in the energy levels cited above. The maximum of about 10% by weight $Tb_2O_3$ represents the value above which little increase in luminescent light output is to be gained by further additions because of the phenomenon known as the "concentration quenching" of luminescence. Thus, above some optimum concentration of terbium, this optimum being a characteristic of each particular glass composition, the further addition of terbium offers no improvement in luminescent light output and actually causes a decrease therein.

Table V is illustrative of the unique effectiveness of terbium to activate the glass compositions of this invention to exhibit strong, visible luminescence. Thus, the examples set out therein, in parts by weight, utilize base compositions within the alkali metal-alkaline earth metal-silica field found operable with terbium activation to produce strong, visible luminescence when subjected to X-radiation between 50-120 kv. However, the relative film densities of these glasses upon exposure to X-rays at 86 kv. dramatically demonstrate the relatively weak efficiency of other listed known activators for glasses which luminesce strongly upon exposure to ultraviolet light.

TABLE V

| Percent | 82 | 83 | 84 | 85 | 86 |
|---|---|---|---|---|---|
| $SiO_2$ | 62.4 | 62.4 | 62.4 | 62.4 | 59.2 |
| SrO | 26.9 | 26.9 | 26.9 | 26.9 | |
| $K_2O$ | 4.6 | 4.6 | 4.6 | 4.6 | |
| $Na_2O$ | 3.0 | 3.0 | 3.0 | 3.0 | 12.4 |
| $Li_2O$ | 1.4 | 1.4 | 1.4 | 1.4 | |
| $Al_2O_3$ | 1.6 | 1.6 | 1.6 | 1.6 | 0.8 |
| BaO | | | | | 27.4 |
| SnO | 1.1 | | | | |
| $Sb_2O_3$ | | 1.2 | | | |
| PbO | | | 1.8 | | |
| $UO_3$ | | | | 0.5 | |
| $Ag_2O$ | | | | | 0.5 |
| Density | 0 | 0 | 0 | 0 | 3 |

| | 87 | 88 | 89 | 90 |
|---|---|---|---|---|
| $SiO_2$ | 57.6 | 48.3 | 48.3 | 48.2 |
| BaO | 26.6 | 41.1 | 41.1 | 41.1 |
| CaO | | | | |
| $Na_2O$ | 12.1 | 8.2 | 8.2 | 8.2 |
| $Al_2O_3$ | 0.8 | | | |
| $Eu_2O_3$ | 2.9 | 2.3 | | |
| $Sm_2O_3$ | | | 2.3 | |
| $Dy_2O_3$ | | | | 2.5 |
| Density | 2 | 9 | 12 | 43 |

While the preferred embodiment of the invention contemplates glasses consisting essentially entirely of four components, viz., alkali metal oxide, alkaline earth metal oxide, terbium oxide, and silica, minor amounts of such compatible metal oxides as $Al_2O_3$, $B_2O_3$, and $P_2O_5$ may be included to improve the working and/or chemical properties thereof. However, to insure excellent luminescent properties in the glass, the total of all such additions should preferably be held below about 10% by weight. To improve the chemical durability of the glasses, up to 15% $Y_2O_3$ and/or up to 20% $La_2O_3$ may be substituted for SrO or BaO without a substantial loss in luminescent light output in the mixed alkali glasses. However, the total of those two additions should not exceed about 20% and the RO content of the glasses should be at least 10%. Also, if desired, other activating metals such as those recited in Table V may be included in the glass although their effectiveness is much below that of terbium. Finally, I have found that not only do PbO and $Sb_2O_3$ not act as satisfactory activators for glasses exposed to X-radiation but, like $Fe_2O_3$, ZnO, $As_2O_3$, $HfO_2$, $Nb_2O_5$, and $Ta_2O_5$ act as poisons to the luminescent effect. Therefore, this entire group of oxides is preferably completely absent from the glass composition, with no more than about 3% by weight total of said oxides being tolerable. To insure the most intense luminescent light output, the individual $Fe_2O_3$ content will preferably be held below 0.5% by weight and that as $As_2O_3$ or $Sb_2O_3$ will preferably be held below 1.0% by weight.

I claim:

1. A transparent glass which emits strong, visible luminescence when exposed to X-radiation having energies ranging between about 50-120 kilovolts consisting essentially, by weight on the oxide basis, of about 3-25% $R_2O$, wherein $R_2O$ consists of 0-5% $Li_2O$ and 0-25% $Na_2O$, 5-55% RO, wherein RO consists of 0-45% SrO and 0-55% BaO, 40-70% $SiO_2$, and 0.75-7% $Tb_2O_3$.

2. A transparent glass according to claim 1 containing up to 20% by weight total of $Y_2O_3$ and $La_2O_3$ in the indicated amounts of 0-15% $Y_2O_3$ and 0-20% $La_2O_3$ and wherein the RO content is at least 10%.

3. A transparent glass which emits strong, visible luminescence when exposed to X-radiation having energies ranging between about 50-120 kilovolts consisting essentially, by weight on the oxide basis, of about 45-65% $SiO_2$, 1-7.5% $Tb_2O_3$, 20-45% RO, wherein RO consists of 0-35% SrO and 0-45% BaO, and 5-20% $R_2O$, wherein $R_2O$ consists of three alkali metal oxides in the indicated proportions selected from the group consisting of 0-2.5% $Li_2O$, 0-5% $Na_2O$, 0-10% $K_2O$, 0-15% $Rb_2O$, and 0-15% $Cs_2O$.

4. A transparent glass according to claim 3 wherein said three alkali metal oxides are present in approximately equimolar proportions.

5. A transparent glass according to claim 4 wherein said $Li_2O$ and $Na_2O$ are present in the amounts 0.75-2.5% and 1.75-5%, respectively.

References Cited

Karapetyan.—Luminescence of Glasses With Rare Earth Activators—Izv. Akad. Nauk. SSSR Ser. Fiz. 26 (6), pp. 799–802, 1963, pp. 791–794 of the English translation supplied.

ROBERT D. EDMONDS, Primary Examiner

U.S. Cl. X.R.

106—52

UNITED STATES PATENT OFFICE
CERTIFICATE OF CORRECTION

Patent No. 3,654,172     Dated April 4, 1972

Inventor(s) Richard F. Reade

It is certified that error appears in the above-identified patent and that said Letters Patent are hereby corrected as shown below:

Column 1, line 43, change "degrees" to -- degree --.

Column 1, line 50, change "kuoro-" to -- fluoro- --.

Column 3, line 2, change "0.45% BaO" to -- 0-45% BaO --.

Column 3, line 33, change "darked" to -- darken --.

Column 5, line 75, delete "the" and insert -- like -- therefor.

Table I, Column 4, line 24, Example 16, change "13.4" to -- 12.4 --.

Table I, Column 4, line 28, Example 19, change "53.7" to -- 43.7 --.

Table IV, Column 6, line 9, Example 56, change "34.1" to -- 35.1 --.

Table IV, Column 6, line 20, Example 61, change "2.3" to -- 2.4 --.

Table IV, Column 6, line 23, Example 65, change "46.7" to -- 46.6 --.

Table IV, Column 6, line 27, Example 66, change "1.4", 2nd occ. to 1.5.

Signed and sealed this 20th day of March 1973.

(SEAL)
Attest:

EDWARD M. FLETCHER, JR.          ROBERT GOTTSCHALK
Attesting Officer                Commissioner of Patents